UNITED STATES PATENT OFFICE.

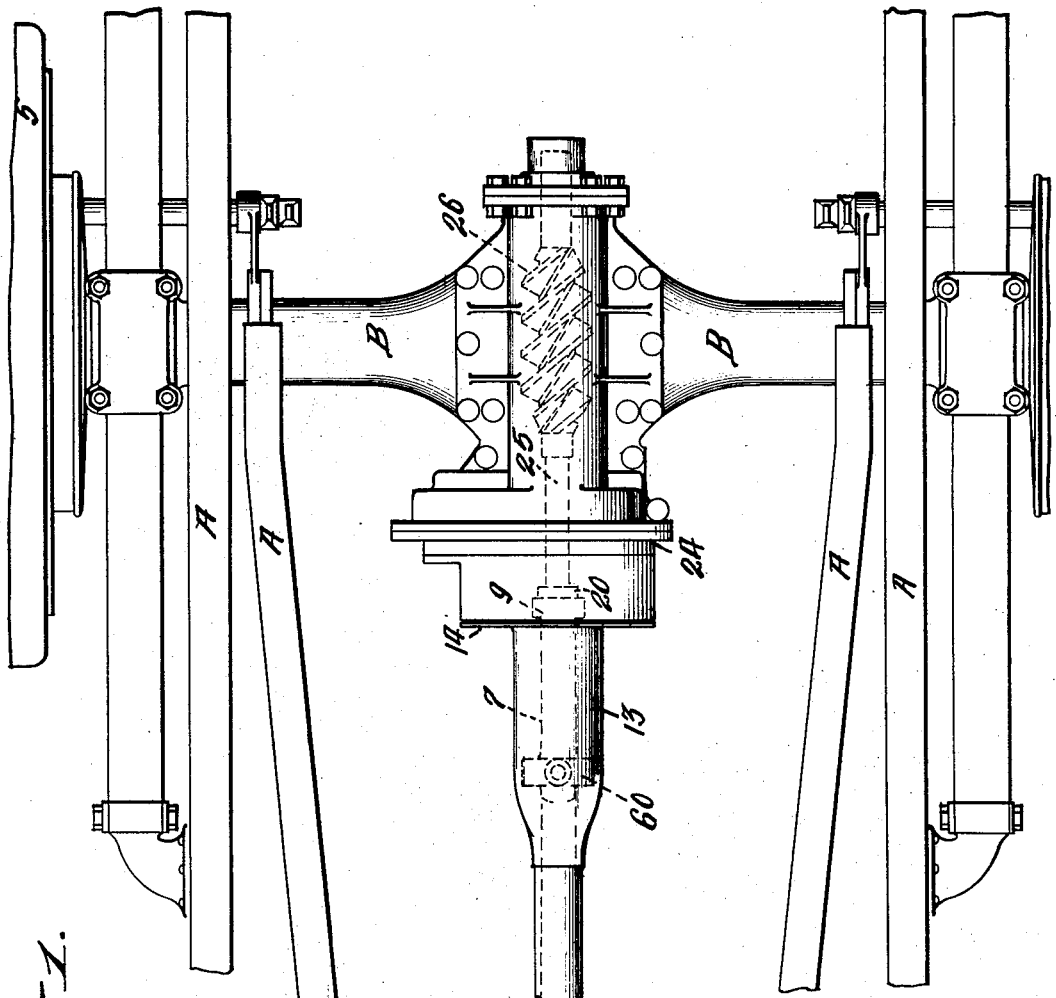
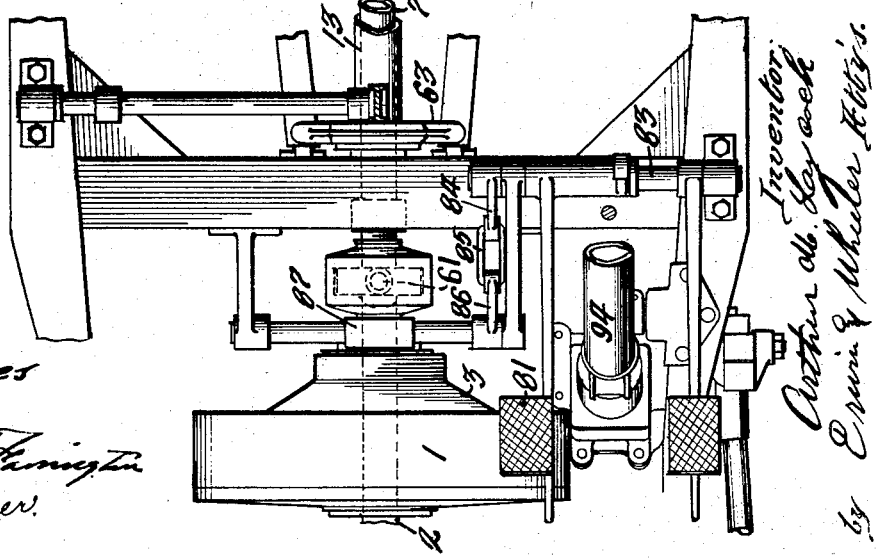

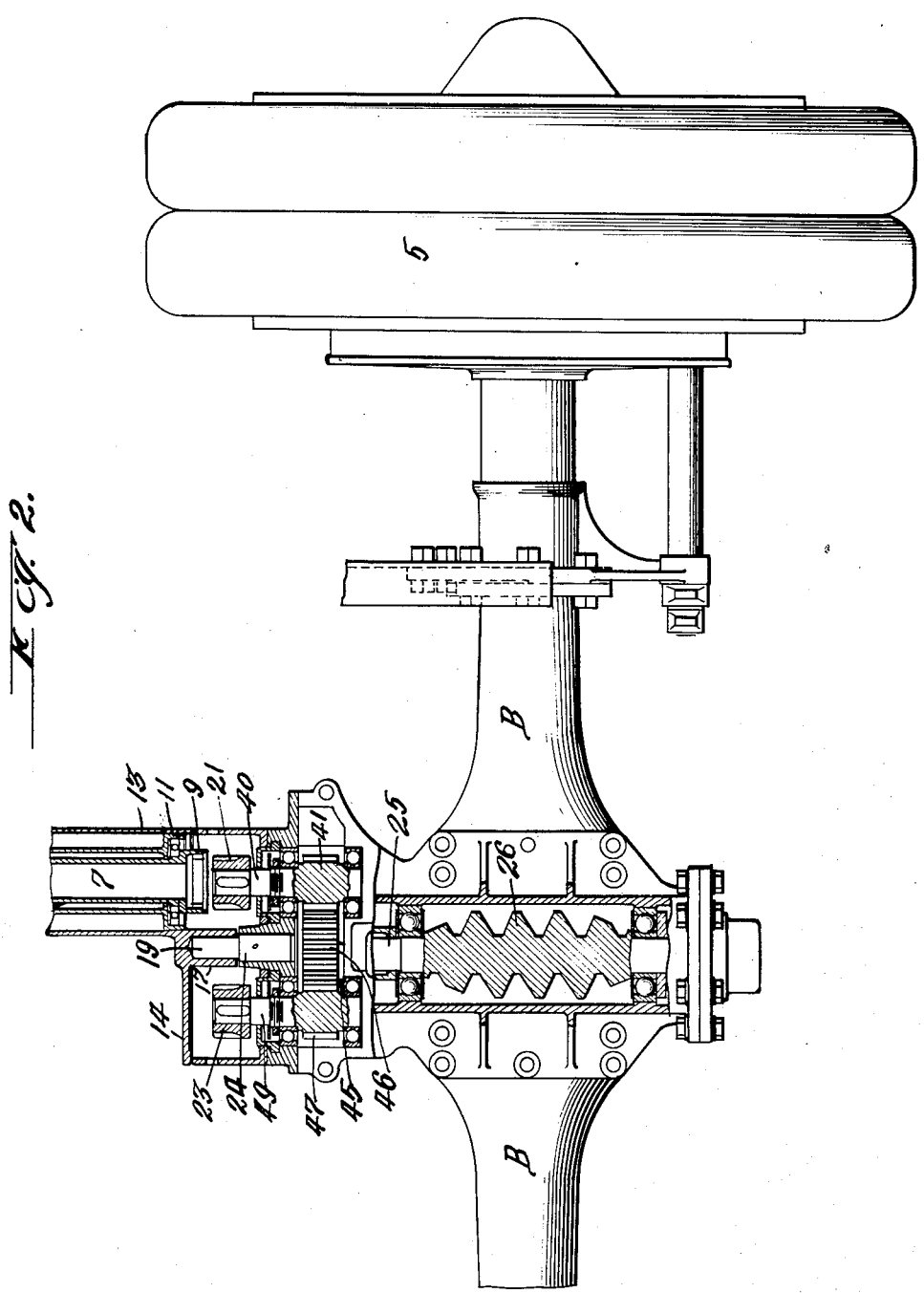

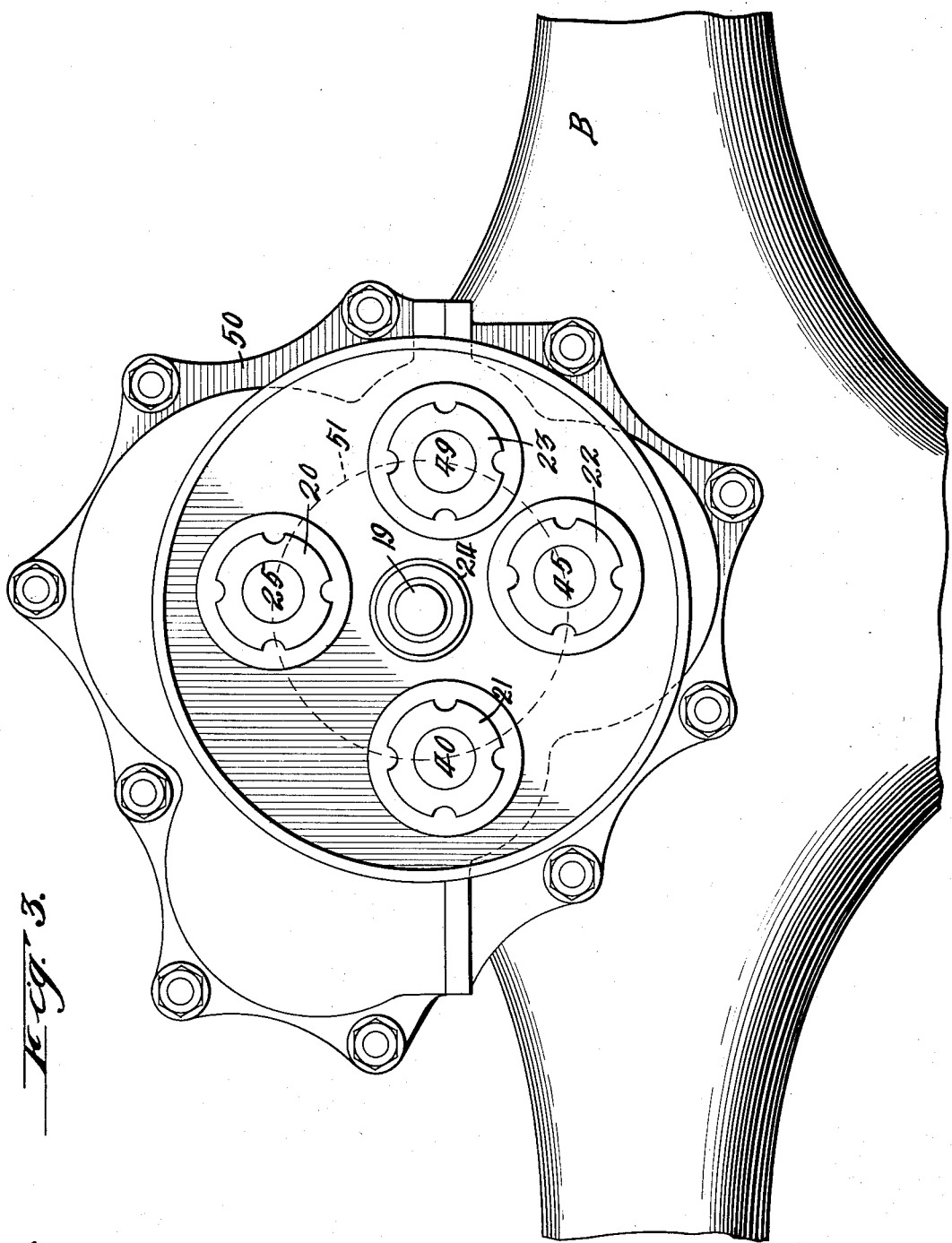

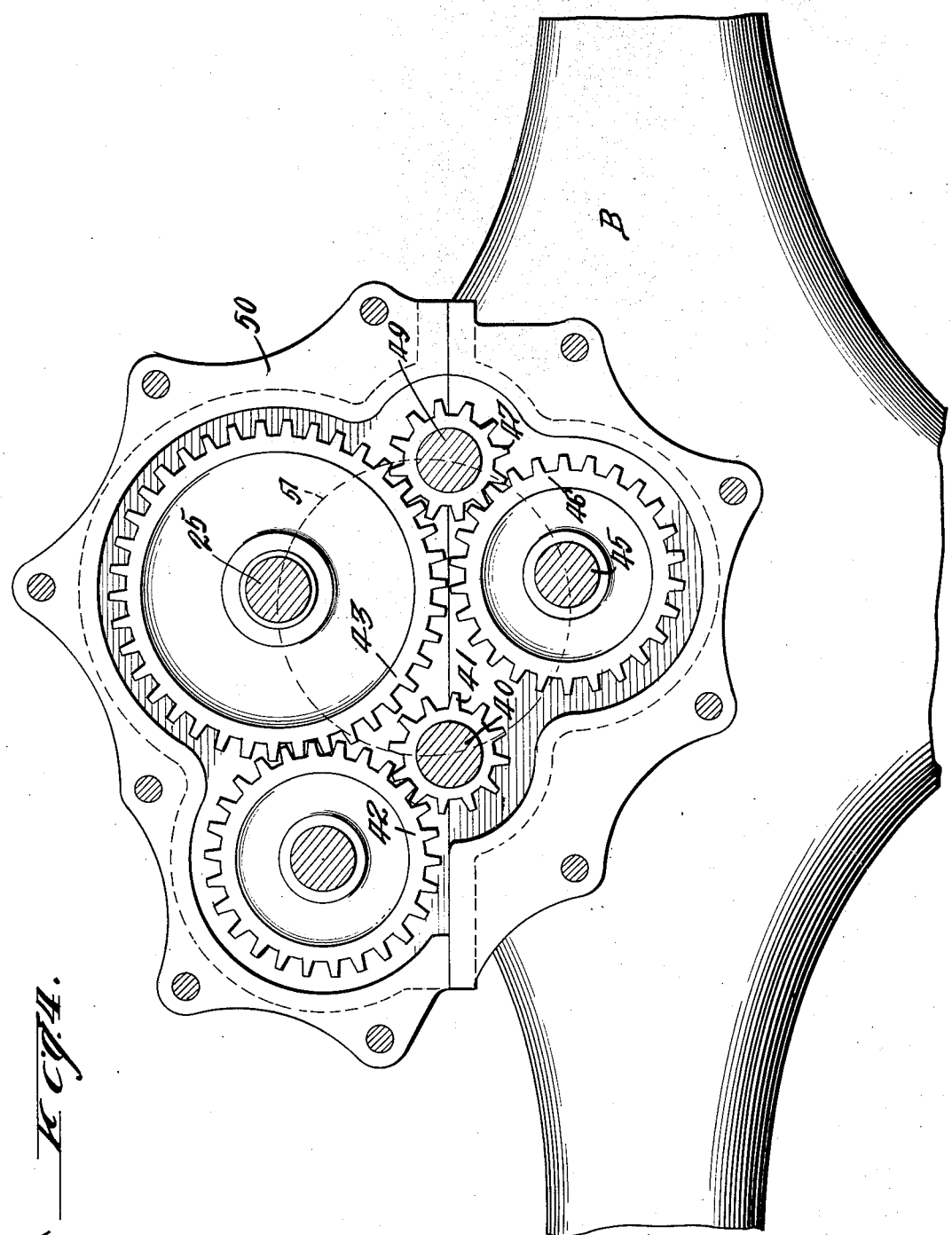

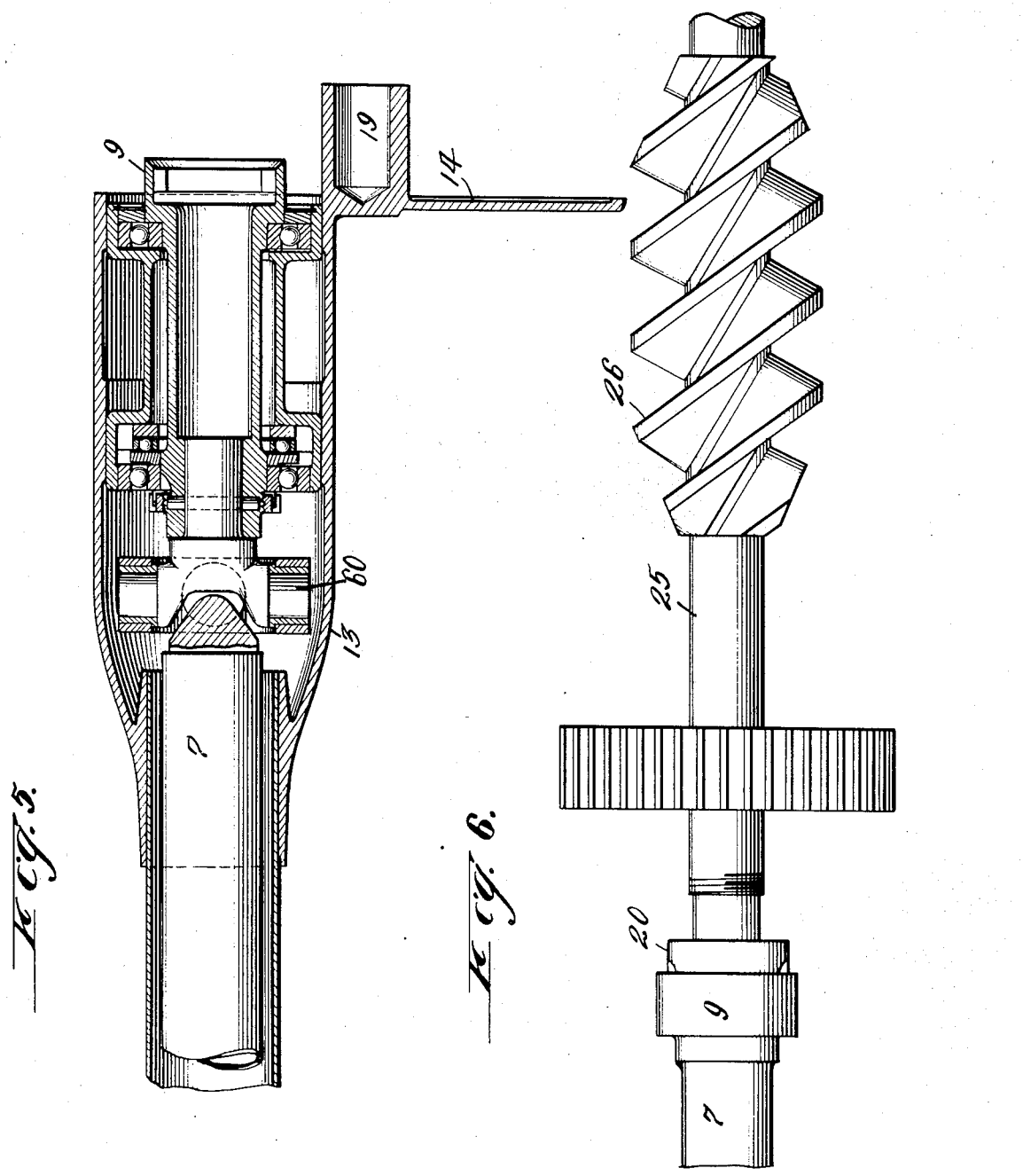

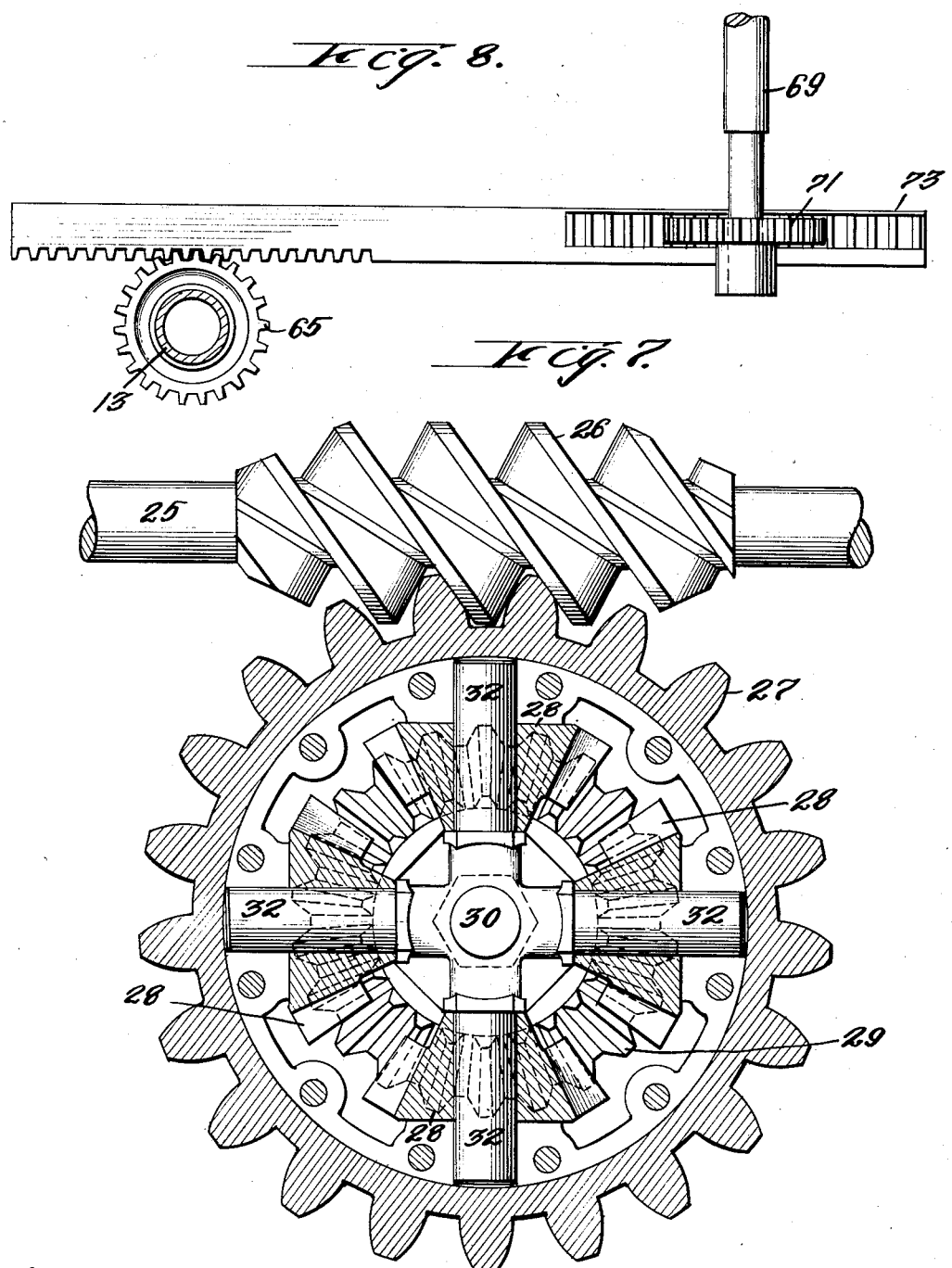

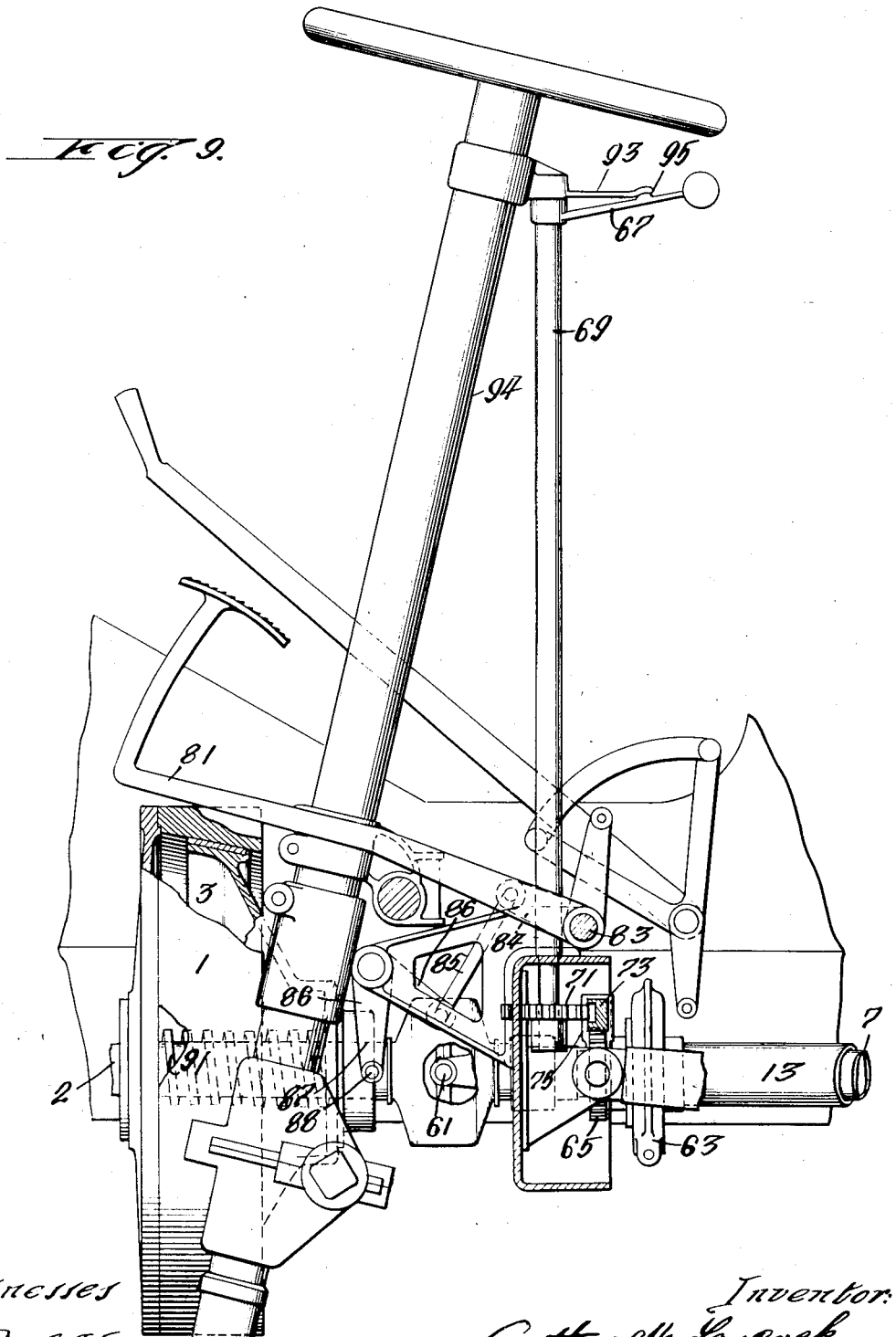

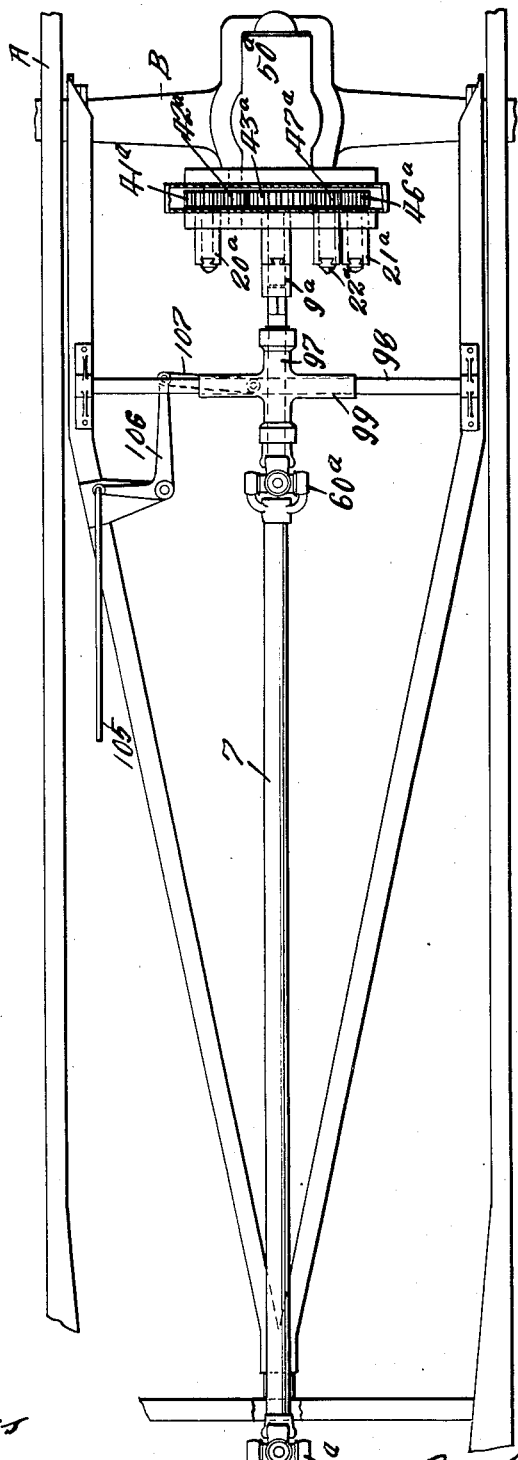

ARTHUR M. LAYCOCK, OF MILWAUKEE, WISCONSIN, ASSIGNOR TO A. O. SMITH COMPANY, OF MILWAUKEE, WISCONSIN, A CORPORATION OF WISCONSIN.

TRANSMISSION MECHANISM FOR MOTOR-DRIVEN VEHICLES.

1,186,483.   Specification of Letters Patent.   Patented June 6, 1916.

Application filed March 20, 1911. Serial No. 615,481.

*To all whom it may concern:*

Be it known that I, ARTHUR M. LAYCOCK, a subject of King George of Great Britain, residing at Milwaukee, county of Milwaukee, and State of Wisconsin, have invented new and useful Improvements in Transmission Mechanism for Motor-Driven Vehicles, of which the following is a specification.

My invention relates to improvements in power transmitting mechanism for motor driven vehicles, including the means for varying and reversing the transmitted speed.

The object of my invention is to provide a form of construction of a reliable and durable type, in which the speed may be varied or reversed without shifting gear wheels into and out of mesh with each other and without injury to the shifting or transmitting mechanism.

A further object of my invention is to provide an improved means of power transmission, particularly adapted for so called truck vehicles, but applicable to any motor driven vehicle, if desired.

A further object of my invention is to provide means, whereby the operation of the transmission mechanism may be easily controlled and adjustments made to vary the speed or reverse the direction of the transmitted motion without interfering with a proper control by the operator of any other portions of the mechanism for operating the vehicle.

In the drawings,—Figure 1 is a plan view of a cased transmission mechanism for motor driven vehicles embodying my invention, showing also portions of the frame and of the rear wheels, and showing the transmission casing partially broken away. Fig. 2 is a plan view, part in section, showing the rear portion of the transmission connections in their relation to the rear axle members. Fig. 3 is a front elevation, showing a portion of the rear axle casing, and also showing the gear casing and the variable speed and reversing couplings. Fig. 4 is a similar view with the gears exposed on section line *x—x* of Fig. 2. Fig. 5 is a detail sectional view of the rear end portion of the main transmission shaft. Fig. 6 is a detail view of the worm shaft and rear end of the transmission shaft as it appears when in driving engagement with the worm shaft. Fig. 7 is a detail view in vertical section, drawn to a plane transverse to the rear axle, showing the worm wheel for driving the rear axle of the vehicle and showing also the differential gearing and the worm shaft for transmitting motion to said worm wheel. Fig. 8 is a detail view of a portion of the speed varying and reversing connections. Fig. 9 is a side elevation of the controlling mechanism, showing also the forward portion of the transmission mechanism, including the driving clutch, parts of the transmission mechanism and speed varying connections being shown in vertical section. Fig. 10 is a plan view of a transmission mechanism and a portion of a vehicle frame, showing a modified form of construction.

Like parts are identified by the same reference characters throughout the several views.

Fig. 1 illustrates the general organization of the rear portion of a motor driven vehicle embodying my invention, a driving clutch member 1 being connected with the source of power (not shown), by a driving shaft 2, and the motion of the driving member 1 being communicated to the driven member 3 of such clutch and from said driven member 3 to the traction wheels 5 through a transmission shaft 7, the slip couplings and gearing of the variable speed and differential mechanism hereinafter described, and the driving axle members. The frame members A, shown in Fig. 1, and the driving axle casing B, (sometimes called the stationary axle), may be of any ordinary construction and need not be further described in explaining my invention.

Referring to Fig. 2, it will be observed that the rear end of the transmission shaft 7 is provided with a coupling member 9 and is supported in suitable bearings at 11 within transmission shaft casing 13. Said casing 13 is provided with a disk shaped flange 14 at its rear end, the center of which is located at one side of the transmission shaft 7 and preferably at one side of the casing 13. On the rear side of this disk flange 14, I provide a centrally located tubular projection 17, which constitutes a socket to receive a supporting pin 19 connected with a member 24, which in turn is supported from the rear axle casing B. With this construction, a rotative movement of the transmission shaft casing 13 will cause it to revolve about the axis of the pin 19, thereby causing the rear end of the transmission shaft 7, including the coupling member 9, to travel in a circle about such axis. The coupling member 9 may thus be rotatively adjusted to register with any one of a set of coupling members 20, 21, 22 and 23 (Fig. 3), which are grouped about the axis of pin 19 at the same radial distance therefrom. The coupling member 9, when in registry with any one of the counterpart coupling members 20 to 23 inclusive, may be brought into engagement with such counterpart coupling member by a longitudinal movement of the transmission shaft 7, said coupling member 9 being adapted to move into slip joint connective engagement with any one of said counterpart members, and when in such engagement, to transmit a rotative movement thereto.

When the coupling member 9 is engaged with coupling member 20, rotative motion will be transmitted directly from shaft 7 to the traction wheels 5 through the coupling members 9 and 20, worm shaft 25, worm 26 (Figs. 6 and 7), worm wheel 27, the pinions and beveled gear wheels 28 and 29 of the differential gearing, and driving axle members 30, upon which the traction wheels are mounted. The differential pinions 28 are supported by stud shafts 32 from the rim of the worm wheel 27, whereby said worm wheel constitutes the driving member of the differential gear mechanism. An extremely simple and direct driving connection is thus furnished between the transmission shaft 7 and the traction wheels.

When it is desired to reduce the speed of the vehicle to the slowest motion transmitted for a given engine speed, the coupling member 9 on transmission shaft 7 is disengaged from clutch member 20 and the casing 13 revolved about the pin 19 until coupling member 9 is brought into registry with coupling member 21, whereupon a longitudinal movement of the transmission shaft will permit an engagement of coupling member 9 with said coupling member 21, and rotative motion will then be transmitted through said coupling member 21, shaft 40, pinion 41 thereon, intermediate or idle gear wheel 42 and gear wheel 43, the latter being fast upon the worm shaft 25.

Assuming that it is desired to increase the speed from that communicated through the coupling member 21, but without developing the maximum speed, it will merely be necessary to disengage coupling member 9 from member 21 and revolve it about the axis of pin 19 as above explained, until it reaches a position for registry with coupling member 22. When the member 9 is in engagement with member 22, rotary motion will be transmitted to the worm shaft 25, through said coupling member 22, its supporting shaft 45, gear wheel 46, pinion 47, and gear wheel 43. The pinion 47 is mounted upon shaft 49, which carries coupling member 23, and it therefore follows that if, (by a further adjustment of the transmission shaft casing 13 about the axis of pin 19), coupling member 9 is brought into registry and engagement with said coupling member 23, motion is transmitted to the worm shaft from said member 23 through shaft 49, pinion 47 and gear wheel 43, but in the reverse direction from that transmitted through the coupling members 20, 21 or 22.

The various gear wheels 41, 42, 43, 46 and 47 are grouped within a casing member 50, as clearly shown in Fig. 4, in which figure, the circle described by the coupling member 9 in effecting its various adjustments, is illustrated by a dotted line 51.

The transmission shaft 7 is universally jointed at 60 and also at 61, (Figs. 1, 5 and 9), thus allowing its rear end to revolve about the axis of pin 19. The axle casing 13 is supported at one end by this pin 19 and near its other end by a bearing member 63, the latter being narrow, with sufficient clearness to allow for the slight movement of casing 13 at this point. The end of the casing, in front of the bearing member 63, is provided with a ring gear wheel 65, rigidly secured thereto, and when rotated, this gear wheel rotates the casing and causes it to revolve, with the transmission shaft 7, about the axis of pin 19, as above explained. Gear wheel 65 is actuated from a manually operated lever 67, through an oscillatory rod 69, gear wheel 71 fast thereon, and rack bar 73, said rack bar having teeth on its front side in engagement with those of gear wheel 71 and another set of teeth on its under side in engagement with those of gear wheel 65 (see Fig. 8). The rack bar 73 slides in a guide way 75.

Preparatory to rotating the gear wheel 65 and casing 13, the transmission shaft 7 must be moved forwardly to release the coupling member, and this movement is also utilized to disconnect the motor by advancing the driven member 3 of the clutch to disengage it from the driving member 1. This motion may be conveniently derived from a foot lever 81, which is pivoted to the frame by pivot shaft 83 and operates through said shaft, shaft arm 84, link 85, and elbow crank 86, one arm of which is forked at 87 and pivotally connected to studs 88 on driven clutch member 3.

In operation at normal speed, the transmission shaft will be coupled directly with the worm shaft 25 through the engagement of coupling members 9 and 20, and the motion transmission from the driving or motor shaft 2 will be in substantially a straight line, co-inciding with the axis of the worm shaft 25. If it is desired to change the speed or reverse the motion, the foot lever 81 is first depressed to disengage clutch member 3 from the driving clutch member 1 by moving clutch member 3 forwardly. This movement carries with it the transmission shaft 7 and disengages coupling member 9 at its rear end from coupling member 20. Lever 67 is then swung to the right, or left, to cause a partial rotation of the casing member 13, the rear end of which is revolved about the axis of pin 19, as above explained, until coupling member 9 is in a position of registry with the counterpart member, which it is desired to select. The pressure is then removed from foot lever 81, whereupon clutch 3 is thrown into engagement by the re-action of spring 91 and shaft 7 simultaneously moved rearwardly to engage coupling member 9 with the selected coupling member, and motion transmitted therethrough to the worm shaft as hereinbefore explained. A gage member 93, mounted upon the steering post 94, is provided with suitable sockets to receive a projection 95 on lever 67, said sockets being so located that when the projection 95 is received by one of the sockets, the coupling member 9 will be in position for engagement with one of its counterparts. It will therefore be observed that in my improved construction, a change of speed or reverse in the direction of motion, does not involve a disengagement and reëngagement of gear members, but merely of the selective coupling members, and that when this selection is taking place, the clutch member 3 and all parts of the transmission mechanism to the rear thereof will be necessarily disconnected from the source of power.

Referring to Fig. 10, it will be observed that it is not essential that the transmission shaft 7 be inclosed or revolved at its rear end about a central axis, such as is represented by the pin 19 in Fig. 2. In the structure shown in Fig. 10, a worm shaft, similar to the worm shaft 25 in the other views, may be inclosed within a casing 50ª which casing may also inclose differential gearing, transmitting motion to the rear axles in the same manner as hereinbefore explained in connection with the other views. The worm shaft 25 in Fig. 10, is directly connected with a gear wheel 43ª corresponding in position and function with the gear wheel 43 in Fig. 4. In function, but not in relative position, the pinion 47ª corresponds with pinion 47, gear wheel 46ª corresponds with gear wheel 46, gear wheel 41ª corresponds with gear wheel 41, and intermediate gear wheel 42ª corresponds with gear wheel 42, in Fig. 4. In Fig. 10, however, the gear wheels 41ª, 43ª, 47ª and 46ª are arranged in a transverse row and the rear end portion of the transmission shaft 7, back of the knuckle joint 60ª, is mounted in a sleeve 97, which is supported from a cross rod 98 by a sleeve 99, whereby a movement of sleeve 99 along cross rod 98, will swing the rear end portion of the transmission shaft 7 to the right, or left, and to a position for selective engagement of a coupling member 9ª with counterpart coupling member 20ª, 21ª, or 22ª. Results of the same character are thus secured, as in the structure set forth in the other views, by engagement of coupling member 9 respectively with coupling members 20, 21, or 22. The shifting movement of the sleeve 99, whereby the selection of the desired coupling member is attained, may be communicated to said sleeve 99 from any suitable manually actuated member (not shown), through a link rod 105, elbow lever 106, and link bar 107.

While the coupling members employed in the structure shown in Fig. 10, may be of the same type as those illustrated in the other views, it is not essential, in either form of construction, that the couplings should be of any specific type, provided they are suitable for the desired purpose

Having thus described my invention, what I claim as new, and desire to secure by Letters Patent, is—

1. A driving mechanism for motor driven vehicles, including the combination with a driven shaft, and a set of variable speed gear members circularly grouped about a common axis, coupling members on the driven shaft and gear members, a transmission shaft provided with a coupling member, adapted for registry interchangeably with the driven shaft and gear member couplings, a bearing member for the transmission shaft, supported to revolve about said axis, and supporting the transmission shaft coupling at substantially the same radial distance from said axis as the gear member and worm shaft couplings.

2. A driving mechanism for motor driven vehicles, including the combination of a transmission shaft, a coupling member fixed thereto at its rear end, a set of coupling members mounted in fixed bearings and arranged for selective engagement with the transmission shaft member, a set of variable speed gears respectively driven from some of said coupling members, and a single driven member in permanent connection with the gears and also directly connected with one coupling member, and means for swinging the transmission shaft to selectively engage its coupling member with any one of the counter-part members.

3. A driving mechanism for motor driven vehicles, including a transmission shaft provided with a coupling member, a bearing member for said shaft, provided with an offset pivotal support, means for swinging said bearing member to adjust the transmission shaft in an arc described from the the axis of said pivot, speed changing members grouped about the axis of said pivot and provided with couplings supported for selective registry with the transmission shaft coupling, and a driven member adapted to receive motion from the transmission shaft either directly or indirectly through the speed changing members.

4. A driving mechanism for motor driven vehicles, including a longitudinally adjustable transmission shaft provided with a coupling member, an adjustable bearing member for said shaft adapted to be moved to shift the shaft and coupling member from one coupling position to another, a worm shaft provided with a coupling member adapted for direct connection with the transmission shaft coupling member in one position of adjustment and variable speed mechanism, having permanent power transmitting connection with the worm shaft and provided with couplings each adapted for registry with the transmission shaft coupling member in one of its different positions of adjustment.

5. A driving mechanism for motor driven vehicles, including a transmission shaft casing, a gear wheel rigidly mounted upon one end thereof, and a swinging bearing member connected with the other end thereof.

6. A driving mechanism for motor driven vehicles, including a rotatable transmission shaft casing having its axis of rotation offset from the axis of the casing.

7. A driving mechanism for motor driven vehicles, including a rotatable transmission shaft casing, in combination with an adjustable member supporting one end portion of the casing, and movable eccentrically with reference to the axis of the casing.

8. A driving mechanism for motor driven vehicles, including a rotatably adjustable transmission shaft casing, in combination with a gear wheel fixed to one end thereof, and manually operated adjusting devices actuating said gear wheel and holding it with the casing in any desired position of adjustment.

9. The combination with a power transmitting shaft, of manually controlled means for adjusting the same longitudinally, a rotatably adjustable casing for said shaft movable at its rear end, in an arc eccentric to the axis of said shaft, and a set of driven members at the rear end of said shaft adapted for selective coupling engagement therewith in the different positions of casing adjustment.

10. The combination with a power transmitting shaft, of manually controlled means for adjusting the same longitudinally, a rotatably adjustable casing for said shaft movable at its rear end, in an arc eccentric to the axis of said shaft, a set of driven members at the rear end of said shaft adapted for selective coupling engagement therewith in the different positions of casing adjustment, said casing having a wheel rigidly fixed to its front end, and manually actuated mechanism for rotating said wheel.

11. The combination with a transmission shaft casing, of a support for one end thereof, and means connected with the other end of said casing, for revolving it about the axis of said support.

12. The combination with a transmission shaft casing, of a support for one end thereof, means connected with the other end of said casing, for revolving it about the axis of said support, said means comprising a gear wheel fixed to said casing, a rack bar in mesh therewith, and manually operated connections for actuating the rack bar.

In testimony whereof I affix my signature in the presence of two witnesses.

ARTHUR M. LAYCOCK.

Witnesses:
LEVERETT C. WHEELER,
IRMA D. BREMER.